Patented Feb. 3, 1931

1,790,920

UNITED STATES PATENT OFFICE

WILLY O. HERRMANN, HANS DEUTSCH, AND ERICH BAUM, OF MUNICH, GERMANY, ASSIGNORS TO CONSORTIUM FUR ELEKTROCHEMISCHE INDUSTRIE, OF MUNICH, GERMANY

PROCESS FOR THE PRODUCTION OF VINYL ESTERS

No Drawing.   Application filed March 14, 1925.   Serial No. 15,569.

It is known that esters of ethylidenglycol are produced by the action of acetylene on organic acids in the presence of mercury salts. The esters of vinyl alcohol being formed only as by-products and in small quantities. Good yields are obtained up to the present time only in case of vinyl esters obtained from chlorinated acetic acids. The technical process for the economical production of other vinyl esters were not known.

We have discovered that where the final product of the action of acetylene on organic acids is an ethyliden compound, the primary product is the corresponding vinyl compound and is smoothly obtained with excellent yields, if further reaction is prevented immediately after its formation. This may be accomplished by different methods, for example, by diluting the reaction liquid with solvents that are inert or take part in the reaction, in the latter event the corresponding ethylidene compound being advantageous, or by adding substances which fix the vinyl compounds formed, e. g. by condensing or polymerizing them. If working discontinuously the excess of acid may be neutralized. The process may be promoted by carrying out the reaction at suitable temperatures, by working under diminished pressure, by shaking out with suitable solvents or by passing vapors or gasses through the liquid, preferably passing an excess of acetylene, a circulating process being advantageous. It may be advisable to purify the acetylene.

The reaction may be promoted by adding a strong acid, preferably in quantities smaller than the stoichiometric equivalent for the formation of the corresponding salts of mercury. The addition of this acid and also of the mercury compound are best effected continuously.

Heretofore there was no method known to avoid the decomposition of a part of generated vinyl ester into a corresponding ester containing twice as much of the organic acid as the simple ester first formed. We have found that this decomposition is hindered by the addition to the reaction liquid of the ester formed by the decomposition or of the organic acids contained in this ester.

The process may be carried out in a continuous or discontinuous manner.

The processes described may be carried out separately or they may be combined in any way. The following examples illustrate the carrying out of our processes, but it is to be understood that we do not limit ourselves to the details in these examples or to the methods mentioned.

Example I 4.3 parts of acetate of mercury are added to 100 parts of acetic acid and an excess of acetylene is allowed to pass through at about 70° C. a mechanical stirrer being employed. The vinyl acetate formed distills off with acetic acid, and a diacetate is formed as by-product, and is condensed or washed out with suitable solvents, e. g. acetic acid. The pure vinyl acetate may be obtained by rectification or other suitable procedure. The surplus of acetylene is recirculated, thus being led back into the reaction vessel. Acetic acid and mercury oxide or acetate of mercury are added continuously or in batches according to the amount of product formed.

Instead of using a mechanical stirrer the reaction liquid may be stirred by gas flow, preferably of acetylene. The volatility of the vinyl acetate may be increased by working under diminished pressure.

Example II 4.3 parts of acetate of mercury or 3.9 parts of mercury oxide are added to 100 parts of acetic acid. After adding 0.45 parts of sulfuric acid, an excess of acetylene is passed through the reaction mixture. The vinyl acetate formed is distilled off under diminished pressure. The rest of the procedure is carried out similarly to Example I, except that small quantities of sulfuric acid are added continuously or in batches, the quantity of the sulfuric acid being preferably smaller than the stoichiometric equivalent for the formation of sulfate of mercury.

Example III

Acetate of mercury or mercury oxide is added to 100 parts of acetic acid as in Example I. An excess of acetylene is passed through the liquid at about 70° C. and then 0.45 part of sulfuric acid is added as in Example II, the further procedure being as in Example I or II.

*Example IV*

4 parts of sulphate of mercury are suspended in 100 parts of acetic acid, the rest of the procedure being as in the foregoing examples.

*Example V*

4 parts of mercury oxide are added to 150 parts of butyric acid and the reaction is carried out according to Examples I–IV. Vinyl butyrate is obtained by the distillation of the product and condensation substantially as described before.

Instead of using the pure organic acid, the acid diluted with one or more homologous ethylidene compounds may be employed, in order to diminish the formation of decomposition products. Instead of sulfuric acid, other strong acids may be used, as phosphoric acid, methansulfocarboxylic acid, or benzenesulfonic acid, or the like.

What we claim is:

1. A process for the production of vinyl esters, which comprises passing an excess of acetylene through a mono-carboxylic aliphatic acid in the presence of not more than substantially 4.3% of a mercury compound, and removing the resultant vinyl ester from the reaction mixture by the escaping excess of acetylene.

2. A process for the production of vinyl acetate, which comprises passing an excess of acetylene through acetic acid in the presence of not more than substantially 4.3% of a mercury compound, and removing the resultant vinyl acetate from the reaction mixture by the escaping excess of acetylene.

WILLY O. HERRMANN.
HANS DEUTSCH.
ERICH BAUM.